(12) United States Patent
Niimura

(10) Patent No.: US 6,266,671 B1
(45) Date of Patent: Jul. 24, 2001

(54) DATA STORAGE APPARATUS, METHOD, AND MEDIUM WITH VARIABLE DATA STORAGE STRUCTURE

(75) Inventor: Yuji Niimura, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/153,331

(22) Filed: Sep. 15, 1998

(30) Foreign Application Priority Data

Oct. 2, 1997 (JP) ................................ 9-269420

(51) Int. Cl.$^7$ ............................... G06F 17/30; G06F 7/00
(52) U.S. Cl. ................................................. 707/100
(58) Field of Search .................... 707/100, 101, 707/102, 1, 2, 500, 205; 711/105, 156, 104, 111, 129, 172

(56) References Cited

U.S. PATENT DOCUMENTS

| | | | |
|---|---|---|---|
| 5,440,336 | * 8/1995 | Buhro et al. | 348/13 |
| 5,485,595 | * 1/1996 | Assar et al. | 395/430 |
| 5,546,558 | * 8/1996 | Jacobson et al. | 395/441 |
| 5,598,549 | * 1/1997 | Rathunde | 395/441 |
| 5,644,697 | * 7/1997 | Matsumoto et al. | 395/182.04 |
| 5,742,809 | * 4/1998 | Hayashi et al. | 395/602 |
| 5,845,313 | * 12/1998 | Estakhri | 711/103 |
| 5,872,955 | * 2/1999 | Asano | 395/500 |
| 5,894,425 | * 4/1999 | Saliba | 364/708.1 |
| 5,928,347 | * 7/1999 | Jones | 710/129 |

FOREIGN PATENT DOCUMENTS 6-28226    2/1994  (JP) .

* cited by examiner

Primary Examiner—Jack Choules
Assistant Examiner—Linh M Pham
(74) Attorney, Agent, or Firm—Venable; Robert J. Frank; Michael A. Sartori

(57) ABSTRACT

A data storage apparatus has a data processing unit and a data store with a variable data storage structure. The data processing unit preferably divides received data into parts of at least two different sizes, stores the parts in the data store, generates connection information indicating how the parts are connected, and reassembles the parts when read from the data store. The connection information may be stored together with the relevant parts of the data.

16 Claims, 4 Drawing Sheets

LOGICAL STRUCTURE OF THE DATA STORE

FIRST EMBODIMENT

SUBDIVISION OF A SECTOR OF DATA

LOGICAL STRUCTURE OF THE DATA STORE

EXAMPLES OF DATA COMPRESSION

EXAMPLE OF DATA DECOMPRESSION,
MODIFICATION, AND RECOMPRESSION

SECOND EMBODIMENT

STRUCTURE OF THE DATA STORE

STRUCTURE OF THE INTERNAL MEMORY
OR THE MICROCONTROLLER

DATA STORAGE APPARATUS, METHOD, AND MEDIUM WITH VARIABLE DATA STORAGE STRUCTURE

BACKGROUND OF THE INVENTION

The present invention relates to a data storage apparatus and medium such as a memory card.

Memory cards such as PC (personal computer) cards are useful for storing data in electronic still cameras, audio recorders, and computers. Some memory cards employ battery-backed-up random-access memory, while others employ flash memory. Many include a microcontroller unit that manages the memory and communicates with the outside world. Often, the interface with the outside world is a sector-based interface conforming to a standard originally intended for use with rotating magnetic-disk drives.

Access speed is an important issue in both memory cards and disk drives. The prior art includes methods of increasing access speed by striping data across different memory chips or disks, which can be accessed in parallel, or by dividing records into sub-records which can be stored on different disks or chips, as in Japanese Unexamined Patent Application 28226/1994.

Another important issue is fitting as much data as possible into the available storage space. Data compression techniques have come into widespread use for increasing the storage capacity of memory cards and magnetic disks.

A further issue is the capability to edit data in place. In a sector-based system, this refers to the ability to read a stored sector of data, modify the data contents, and store the modified data at the same sector address. This capability is useful when part of an image is modified, for example.

A problem is that if the sector has been stored in a compressed from, then after decompression, modification, and recompression, the new compressed data may be larger than the old compressed data, even if the decompressed data size is unchanged. Thus the modified compressed sector may not fit into the space allocated to the original compressed sector.

A more general problem is that magnetic disks and memory cards often employ a fixed data storage structure, using clusters or blocks having a single fixed length. This type of structure is unsuitable for storing data of variable size. A known solution is to store data in an unstructured linear format, without subdivision into clusters or blocks, but this solution does not readily provide an edit-in-place capability.

SUMMARY OF THE INVENTION

An object of the present invention is to store data of variable size in a flexible manner.

Another object is to store data in a manner enabling the data to be edited in place.

The invented data storage apparatus comprises a data store having a variable data storage structure, and a data-processing unit. The data processing unit receives data from an external device, processes the received data, stores the processed received data in the data store, using the variable data storage structure, reads the stored data from the data store, processes the read data, and sends the processed read data to the external device.

In processing received data, the data processing unit preferably divides the received data into parts and generates connection information indicating how the parts are connected together, then uses the connection information to reassemble the data when reading the data. The data storage structure is preferably varied by dividing the received data into parts in different ways.

The connection information preferably comprises a flag indicating whether one part is followed by another, and an address indicating the storage location of the following part, if present.

The data processing unit preferably divides received data into first parts having a first fixed length, then divides remaining portions of the received data into second parts having a second fixed length shorter than said first fixed length. The data store preferably comprises a first area for storing the first parts, and a second area for storing the second parts. The connection information may be stored in the data store, or in an internal memory in the data processing unit. Connection information stored in the data store is preferably stored together with respective first parts and second parts.

The invented method of storing data received from an external device divides the data into parts of at least two different lengths, and generates connection information as described above.

The invented data storage medium is a computer-readable medium comprising the invented data storage apparatus.

DETAILED DESCRIPTION OF THE INVENTION

Embodiments of the invention will be described with reference to the attached illustrative drawings.

Figure 1:
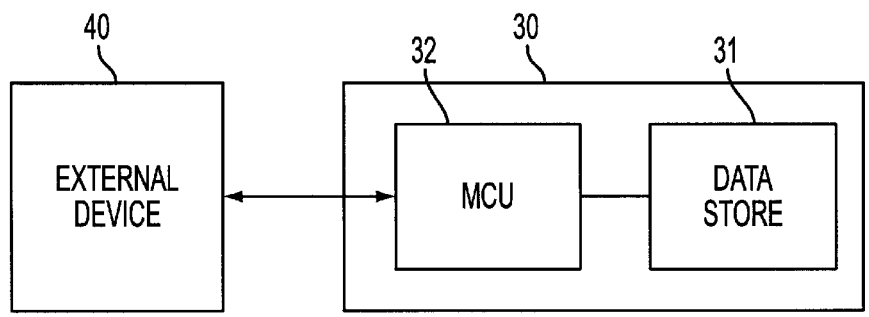
FIG. 1 is a block diagram illustrating a first embodiment of the invention.

Referring to FIG. 1, a first embodiment of the invention is a PC card 30 comprising a data store 31 and a microcontroller unit or MCU 32. The MCU 32 communicates with an external device 40 such as the central processing unit of a computer, camera, or audio recorder, and provides access to the data store 31. Providing access includes processing the data written to and read from the data store 31 by dividing the data into parts and reassembling the parts. The MCU 32 also compresses and decompresses the data, and detects and corrects data errors. The data store 31 comprises, for example, one or more static random-access memory (SPAM) chips with a combined capacity of one megabyte (1 Mbyte). The data store 31 also comprises a battery (not shown) for backing up the memory contents. The external device 40 views the PC card 30 as a data storage medium similar to a magnetic disk, and pays no regard to the internal structure of the PC card 30.

Figure 2:
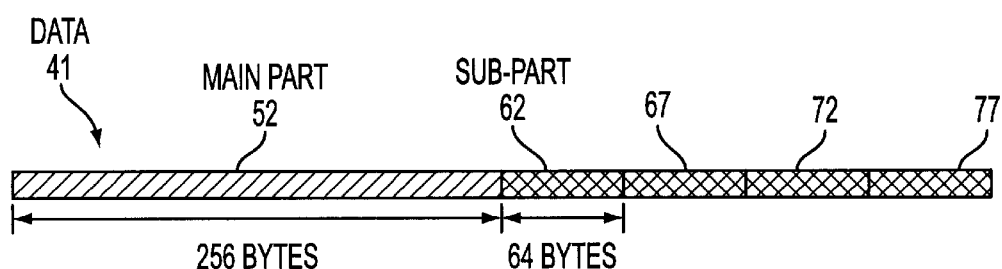
FIG. 2 illustrates the subdivision of a sector of data.

Referring to FIG. 2, the MCU 32 and the external device 40 send and receive sectors of data 41 having a fixed length of five hundred twelve bytes (512 bytes). The MCU 32 compresses each received sector, and divides the compressed data into a main part 52 and a variable number of sub-parts 62, 67, 72, 77. The main part has a fixed length of two hundred fifty-six bytes (256 bytes). Each sub-part has a fixed length of sixty-four bytes.

Figure 3:
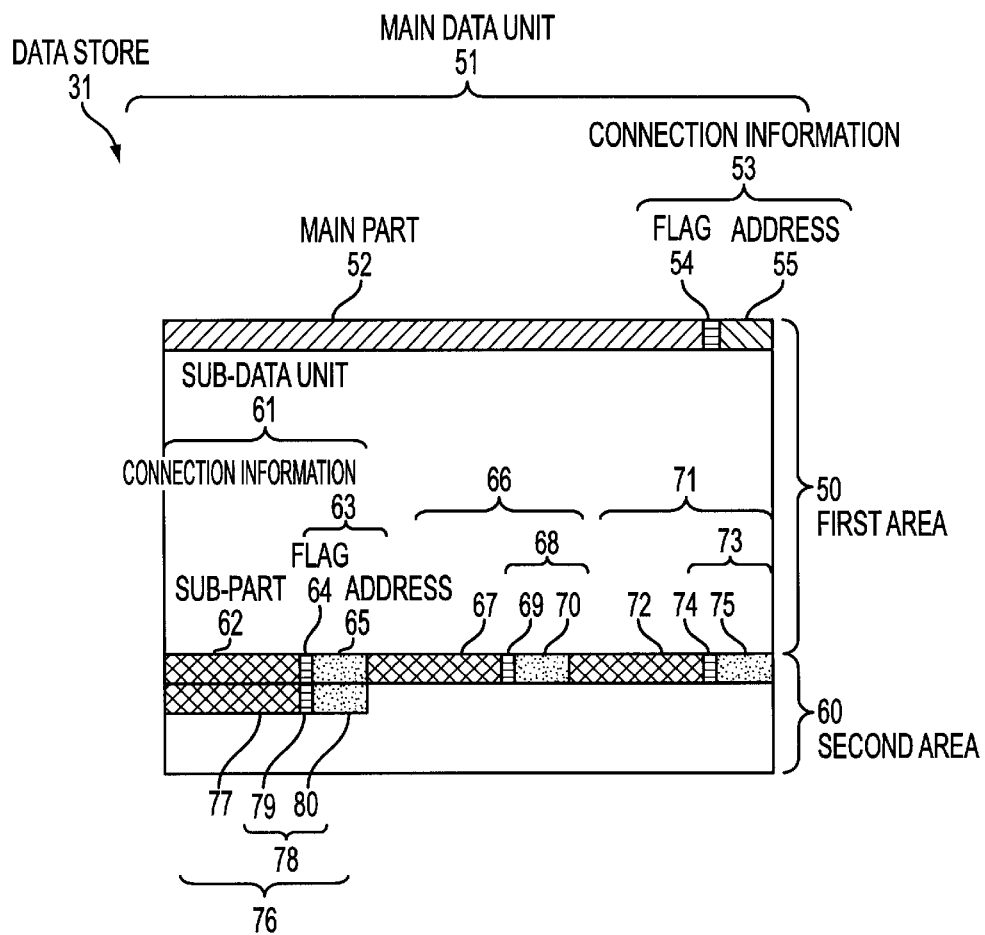
FIG. 3 illustrates the logical structure of the data store in FIG. 1.

Referring to FIG. 3, the data store 31 is divided into a first area 50 and a second area 60. The first area 50 has space for storing two thousand eight (2008) main data units 51, each comprising a main part 52 and connection information 53, the connection information 53 comprising one flag bit 54 and a fifteen-bit address 55. The size of each main data unit 51 is two hundred fifty-eight bytes (258 bytes). The second area 60 has space for storing eight thousand thirty-two (8032) sub-data units 61, 66, 71, 76, each sub-data unit comprising a sub-part 62, 67, 72, 77 and connection information 63, 68, 73, 78, the connection information comprising a flag bit 64, 69, 74, 79 and a fifteen-bit address 65, 70, 75, 80. The size of each sub-data unit is sixty-six bytes.

The flag bit 54 in a main data unit 51 is set to one ('1') if the main data unit is followed by another main data unit or a sub-data unit, and is otherwise cleared to zero ('0'). The address 55 in each main data unit 51 is a logical address identifying the storage location of the following main data unit or sub-data unit. The units can be individually distinguished by their logical addresses, because the total number of main data units and sub-data units is ten thousand forty (10,040), which is less than the fifteenth power of two ($2^{15}$). The MCU 32 converts the logical address 55 to a physical address in the data store 31.

The flag bit and address in each sub-data unit similarly indicate whether the sub-data unit is followed by another sub-data unit, and identify the storage location of the following sub-data unit, if present.

Next, the operation of storing a sector of data received from the external device 40 will be described.

The MCU 32 uses a data compression algorithm to compress the received data, generates an error-correcting code for the compressed data, and adds the error-correcting code to the compressed data. Data compression algorithms are well known. Depending on the contents of the data, the size of the compressed data varies from about half of the uncompressed sector size to about the same as the uncompressed sector size.

Next, the MCU 32 divides the compressed sector of data into at least one main part and the necessary number of sub-parts. In the present case, there are one main part 52 and four sub-parts 62, 67, 72, and 77.

Consulting an allocation-unit table not shown in the drawings, the MCU 32 decides where to store the data, selecting an unoccupied main data unit 51 and four unoccupied sub-data units 61, 66, 71, 76. The main part 52 of the compressed data is stored in main data unit 51. Flag bit 54 is set to '1' to indicate the existence of a following unit, in this case sub-data unit 61, the logical address of which is written in main data unit 51 as address 55.

Sub-parts 62, 67, 72, 77 are similarly stored in sub-data units 61, 66, 71, 76. Flags 64, 69, 74 are set to '1' to indicate the presence of following sub-data, identified by addresses 65, 70, 75. For example, the logical address of sub-data unit 66 is written as address 65. Flag 79 is cleared to '0' since there is no following sub-data unit. The value of address 80 is irrelevant; an arbitrary value such as zero is written.

Figure 4:
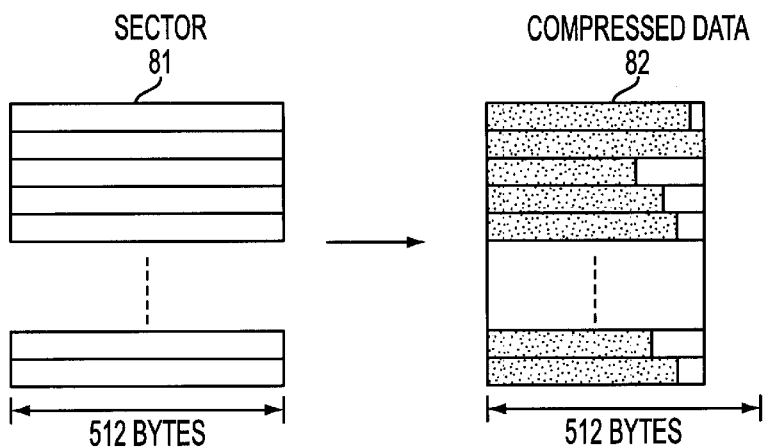
FIG. 4 shows examples of data compression.

This storage scheme easily handles varying lengths of compressed data. For example, FIG. 4 shows 512-byte sectors 81 being compressed to data 82 of assorted lengths.

The first embodiment stores the compressed data 82 efficiently by allocating one main data unit and one, two, or three sub-data units, as required, to each compressed sector.

When no main data units are free, a compressed sector can be stored entirely in sub-data units. Sectors that compress to one hundred ninety-two bytes (192 bytes) or less can also be stored entirely in sub-data units, to avoid waste of space in main data units.

Next, the operation of reading the stored sector from the data store 31 will be described. This operation is performed in response to a read request from the external device 40.

The sector 41 is identified by a sector number, which the MCU 32 translates into the physical address of main data unit 51, using the allocation-unit table mentioned above. The MCU 32 reads the entire contents of main data unit 51 from the data store 31, places the main part 52 in an internal buffer (not shown) for decompression, and tests the flag 54. Since flag 54 is set to '1,' the MCU 32 translates address 55 into the physical address of sub-data unit 61, and reads sub-data unit 61 from the data store 31.

Next, the MCU 32 sets sub-part 62 in the above-mentioned buffer, tests flag 64, discovers the existence of a further connected sub-data unit, translates address 65 into the physical address of this sub-data unit 66, and reads sub-data unit 66 from the data store 31. Sub-data units 66, 71, and 76 are processed in the same way as sub-data unit 61. When sub-data unit 76 is read, flag 79 is found to be '0,' so no further sub-data unit is read.

When main part 52 and sub-parts 62, 67, 72, 77 have been reassembled in the buffer, the MCU 32 checks for errors, corrects any errors found, decompresses the sector, and transfers the decompressed sector 41 to the external device 40. The external device 40 receives the same data as originally sent to the PC card 30.

If the external device 40 processes the received data in a way that modifies the compressed data size, the MCU 32 can use the same main data unit 51 to store the modified data, increasing or decreasing the number of sub-data units as necessary. If the modification greatly increases the data size, the MCU 32 can use two or more main data units, and additional sub-data units as necessary, to store the modified data. The data storage structure shown in FIG. 3 copes easily with variable data size, allowing data to be edited in place freely.

Figure 5:
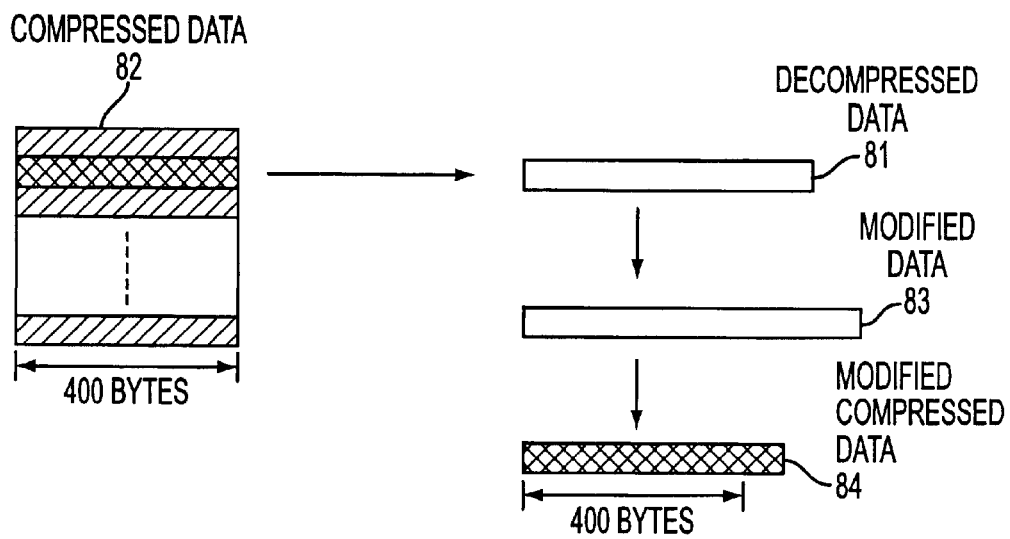
FIG. 5 shows an example of data decompression, modification, and recompression.

FIG. 5 shows an example in which compressed data 82 with a length of four hundred bytes are read and decompressed, and the decompressed data 81 are modified, increasing the data size. When the modified data 83 are compressed, the new compressed data 84 are longer than the original compressed data 82. The original compressed data 82 are stored in one main data unit and three sub-data units; the modified compressed data 84 are stored in one main data unit and four sub-data units, without changing the sector number. Alternatively, the modified compressed data 84 can be stored in two main data units.

The flag and address need not be stored at the end of each main data unit and sub-data unit. The flag and address can be stored at the beginning of each main data unit and sub-data unit, to simplify the pre-fetching of data.

The sub-data units need not all have the same size. Sub-data units of several different sizes can be provided, to permit the selection of a group of main data units and sub-data units with a total size more closely matching the actual size of the data to be stored.

Next, a second embodiment will be described.

Figure 6:
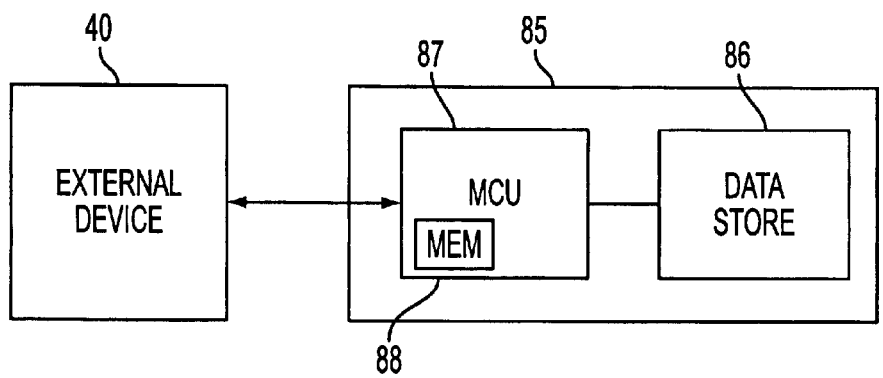
FIG. 6 is a block diagram illustrating a second embodiment of the invention.

Referring to FIG. 6, the second embodiment is a PC card 85 comprising a data store 86 and a MCU 87 that communicates with an external device 40. The MCU 87 has an internal memory (MEM) 88. This internal memory 88 may comprise, for example, battery-backed-up static random-access memory cells, or electrically erasable and programmable memory cells. The data store 86 has a capacity of one megabyte (1 Mbyte), as in the first embodiment. The MCU 87 divides data into main parts and sub-parts in the same way as in the first embodiment, as shown in FIG. 2.

Figure 7:
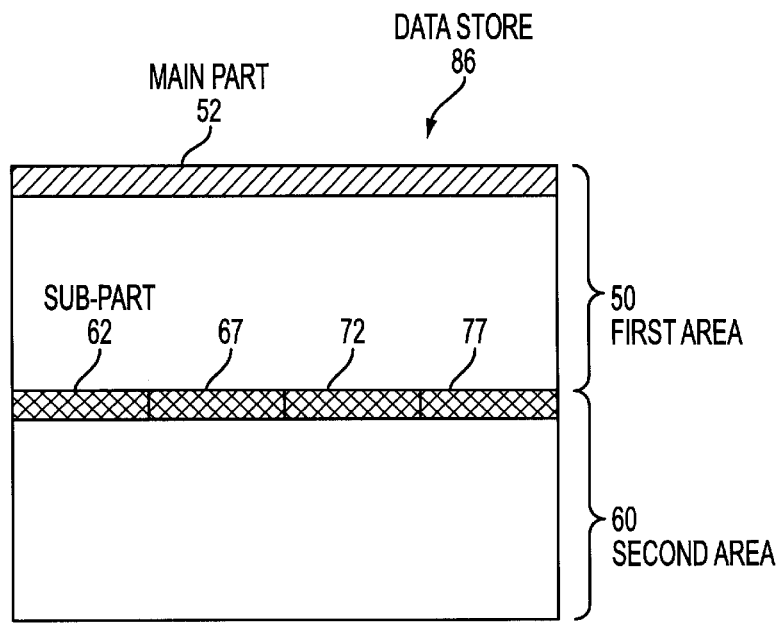
FIG. 7 illustrates the structure of the data store in FIG. 6.

Referring to FIG. 7, the data store 86 is divided into a first area 50 and a second area 60 as in the first embodiment, but the first area 50 stores only the main parts 52 of the compressed data, without connection information. Similarly, the second area 60 stores only sub-parts 62, 67, 72, 77, without connection information. Each main part is two hundred fifty-six bytes (256 bytes) long. Each sub-part is sixty-four bytes (64 bytes) long.

Figure 8:
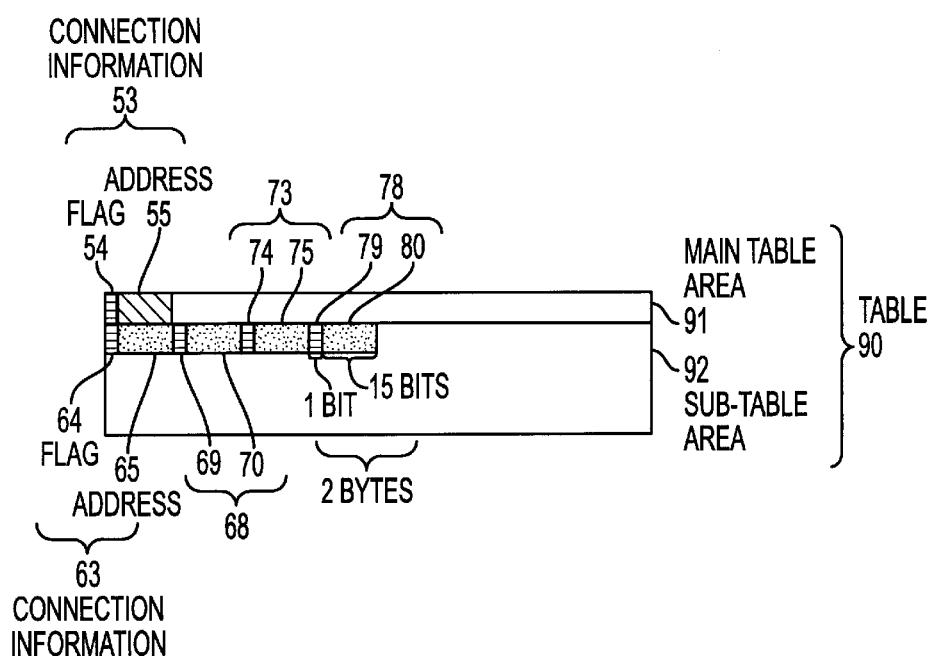
FIG. 8 illustrates the structure of the internal memory or the microcontroller in FIG. 5.

The connection information that was stored in the data store in the first embodiment is stored in the internal memory 88 in the MCU 87 in the second embodiment. Referring to FIG. 8, the internal memory 88 comprises a table 90, which is divided into a main table area 91 and a sub-table area 92. The main table area 91 stores connection information 53, comprising a one-bit flag 54 and fifteen-bit address 55, for each main part 52 stored in the data store 86. The sub-table area 92 stores connection information 63, 68, 73, 78, comprising one-bit flags 64, 69, 74, 79 and fifteen-bit addresses 65, 70, 75, 80, for the sub-parts 62, 67, 72, 77 stored in the data store 86.

The second embodiment operates in the same way as the first embodiment, except that the connection information stored in the MCU 87 instead of the data store 86. The MCU 87 reads the connection information of each main part or sub-part from the table 90 immediately after reading the main part of sub-part from the data store 86. Alternatively, the connection information can be read before the part, to facilitate pre-fetching.

One advantage of the second embodiment is that the MCU 87 can access its own internal memory 88 more quickly than the data store 86 can be accessed. Physical address calculations are also simplified, because he main parts are stored on two-hundred-fifty-six-byte (256-byte) boundaries in the data store 86, and the sub-parts on sixty-four-byte (64-byte) boundaries. The MCU 87 can generate physical addresses more rapidly, using less program code, than in the first embodiment.

Another advantage is that the entire capacity of the data store 86 can be used for storing data. An offsetting disadvantage is that the size of the internal memory 88 may limit the number of sectors that can be stored. To take a specific example, if the internal memory 88 provides only nineteen thousand six hundred bytes (19,600 bytes) of space for the table 90, for example, then connection information for only nine thousand eight hundred parts (9800 parts) can be stored, instead of the ten thousand forty parts storable in the first embodiment.

This disadvantage can be overcome, however, by storing the table 90 in a separate memory chip in the PC card 85. For example, instead of the MCU 87 with internal memory 88, the second embodiment may employ a microprocessor with external memory as its data processing unit, the external memory constituting a separate memory chip (not shown) in the PC card 85.

The MCU or microprocessor in the PC card need not perform the processes of compression, decompression, and error correction described above. For example, compression and decompression may be performed in the external device 40; the flexible data storage structure provided by invented PC card is still useful for storing the resulting variable-size data. This flexible data storage structure is also useful even when the stored data are not compressed.

The invention has been described as storing data in battery-backed-up random-access memory, but other types of non-volatile memory, such as flash memory, can be employed with similar effects. The invention can be practiced with any type of data store, including magnetic and optical types as well as semiconductor memory.

The invention is not restricted to a card configuration, and can be connected to any type of external device.

Those skilled in the art will recognize that further variations are possible within the scope claimed below.

What is claimed is:

1. A data storage apparatus which stores data accessed by an external device, comprising:

a data processing unit which receives the data from the external device, divides the received data into first and second parts, and generates connection information to connect the first and second parts; and a data store having first and second areas, which receives the first and second parts, stores the first parts in the first area, and stores the second parts in the second area;

wherein the connection information includes a flag which indicates an existence of a following one of the second parts, and an address which indicates a storage location of the following one of the second parts in the data store.

2. The data storage apparatus of claim 1, wherein the data processing unit varies a structure of the stored data by dividing the received data into the first and second parts in different ways.

3. A computer-readable data storage medium comprising the data storage apparatus of claim 2.

4. The data storage apparatus of claim 1, wherein the data processing unit reads the stored data from the data store, processes the read data, and sends the processed data to the external device.

5. The data storage apparatus of claim 2, wherein the data processing unit uses the connection information to reassemble the first and second parts when reading the stored data.

6. The data storage apparatus of claim 5, wherein the first and second parts have two different fixed lengths.

7. The data storage apparatus of claim 5, wherein the first parts have a first fixed length and the second parts have a second fixed length shorter than the first fixed length.

8. The data storage apparatus of claim 7, wherein the data processing unit stores the connection information in the data store.

9. The data storage apparatus of claim 8, wherein the data processing unit stores the connection information together with respective first parts and second parts, the connection information stored together with each first part connecting the first part to another one part among the first parts and the second parts, the connection information stored together with each second part connecting the second part to another one of the second parts.

10. The data storage apparatus of claim 7, wherein the data processing unit has an internal memory, and stores the connection information in the internal memory.

11. A method of storing data received from an external device, comprising:

dividing the data into first and second parts having at least two different lengths; generating connection information connecting the first and second parts; and storing the first and second parts and the connection information in a data store;

wherein the connection information includes a flag which indicates an existence of a following one of the second parts, and an address which indicates a storage location of the following one of the second parts in the data store.

12. The method of claim 11, wherein the first parts have a first fixed length, and the second parts have a second fixed length shorter than the first fixed length.

13. The method of claim 12, wherein the connection information is stored together with the first parts and second parts.

14. The method of claim 13, wherein said data store is divided into a first area and a second area, and said step of storing further comprises the steps of:

generating, for each first part among said first parts, a first unit comprising including said first part and the connection information connecting said first part to another part among said first parts and said second parts;

storing said first unit in said first area;

generating, for each second part among said second parts, a second unit comprising including said second part and the connection information connecting said second part to another one of said second parts; and storing said second unit in said second area.

15. The method of claim 12, wherein said step of storing stores said connection information separately from said first parts and second parts.

16. The method of claim 15, wherein said data store is divided into a first area, a second area, and a third area, and said step of storing further comprises the steps of:

storing said first parts in said first area;

storing said second parts in said second area; and storing said connection information in said third area.

* * * * *